United States Patent [19]

Prager

[11] Patent Number: 4,596,224

[45] Date of Patent: Jun. 24, 1986

[54] DIESEL FUEL HEATER WITH FUEL RESERVOIR MEANS

[75] Inventor: Lee A. Prager, Raymond, Me.

[73] Assignee: GTE Products Corporation, Stamford, Conn.

[21] Appl. No.: 490,086

[22] Filed: Apr. 29, 1983

[51] Int. Cl.⁴ .................. F02M 31/00; B01D 35/18
[52] U.S. Cl. ................... 123/557; 123/549; 210/184; 210/186
[58] Field of Search ............. 123/557, 549, 196 AB; 210/184, 186; 219/205, 306, 307, 206

[56] References Cited

U.S. PATENT DOCUMENTS

| | | | |
|---|---|---|---|
| 4,091,265 | 5/1978 | Richards | 123/557 |
| 4,177,778 | 12/1979 | Naitou | 123/557 |
| 4,227,969 | 10/1980 | Engel | 210/184 |
| 4,279,234 | 7/1981 | Marcoux | 123/557 |
| 4,354,946 | 10/1982 | Warlick | 210/184 |
| 4,387,691 | 6/1983 | Marcoux | 210/186 |
| 4,395,996 | 8/1983 | Davis | 123/557 |
| 4,406,285 | 9/1983 | Siefer | 123/557 |
| 4,406,785 | 9/1983 | Vrooman | 123/557 |

Primary Examiner—Ronald H. Lazarus
Attorney, Agent, or Firm—James Theodosopoulos

[57] ABSTRACT

An improved diesel fuel heater wherein a predetermined quantity of fuel is captured within the heater in a reservoir defined therein. This quantity is heated by the heater's positive temperature coefficient (PTC) thermistors (and heat conductive mounting plate) to assure a heated quantity of fuel will be pumped into the fuel system's filter element to enhance de-waxing thereof.

11 Claims, 3 Drawing Figures

DIESEL FUEL HEATER WITH FUEL RESERVOIR MEANS

TECHNICAL FIELD

The present invention relates, in general, to diesel fuel heaters, and more particularly to diesel fuel heaters which employ positive temperature coefficient (PTC) thermistors as the heat source thereof.

BACKGROUND OF THE INVENTION

The use of diesel engines has increased substantially in recent years, particularly in the automotive field. This increased popularity is due to, among other things, improved fuel mileage in comparison to today's standard gasoline engine. In addition, diesel engines typically produce emissions at significant reduced pollutant levels when compared to those of standard gasoline engines. One problem associated with diesel engines, however, is that they have been characteristically difficult to start in cold weather. This is due primarily to an inherent tendency of the diesel fuel to gel in sufficiently cold temperatures, thus causing such starting difficulties. In addition, engines which use fuels in this condition possess a relatively high tendency to stall, even after having been successfully started.

To overcome this problem, fuel line heaters have been utilized, such as the variety that employs a resistance wire wrapped within an insulator. However, heaters of this variety, typically located along the fuel line supplying the engine, have not proven to be very efficient.

In Ser. No. 334,292, filed Dec. 4, 1981 and entitled "Diesel Fuel Heater" (Inventor: David A. Siefer), there is defined a fuel heater which employs at least one positive temperature coefficient thermistor located in the fuel passage of the heater's housing for raising the temperature of the fuel passing therethrough to hopefully reduce gelling. In an application filed concurrently herewith under Ser. No. 490,069, Filed Apr. 29, 1983, entitled "Diesel Fuel Heater and Combined Filter-Heater Assembly" (Inventor: Stephen T. Manchester), there is described a fuel heater which is readily capable of being a retrofit component in many of today's spin-on fuel filter assemblies. Both heaters as described in these applications are compact in design, relatively inexpensive to manufacture, and represent substantial improvements over existing heaters such as those of the resistance variety.

In accordance with the teachings of the instant invention, there is defined a diesel fuel heater which provides a means for enhanced fuel heating in comparison to the designs shown in the described two applications. Specifically, the invention provides a means for collecting a predetermined quantity of fuel within the heater such that this quantity can be heated prior to passage thereof into the filter element. It is thus possible to pass a heated quantity of fuel into the filter and thereby facilitate de-waxing of any gelled fuel therein in comparison to the operation of the heaters described above wherein no such accumulation is provided. Providing such a quantity of fuel also has proven particularly advantageous in a PTC-heated system due to the ability of the captured fuel to provide increased heat sinking, thus increasing power draw by the PTCs and thereby enhancing operation of these devices.

It is believed, therefore, that a diesel fuel heater possessing the above advantageous features as well as others as mentioned hereinbelow would constitute a significant advancement in the art.

DISCLOSURE OF THE INVENTION

Accordingly, it is a primary object of the present invention to provide a substantially improved diesel fuel heater, and particularly one which employs PTC thermistors as the heat source thereof.

It is another object of th invention to provide a diesel fuel heater which is compact in design and relatively inexpensive to produce.

As described below, it is yet another object of the invention to provide a diesel fuel heater which can be readily incorporated in the heater designs described and shown in the above two applications.

In accordance with one aspect of the invention, there is provided an improved diesel fuel heater for use with a fuel filter component including a filter housing and a fuel filter element designed for being normally secured to the fuel filter's housing. The diesel fuel heater of the invention comprises an insulative housing, an electrically conductive mounting plate secured within the insulative housing, the mounting plate and insulative housing defining a fuel passage therein through which diesel fuel passing from the filter housing to the filter element will pass, a plurality of positive temperature coefficient thermistors spacedly positioned on the mounting plate and designed for contacting the fuel and heating same prior to its entry into the filter element, and means for coupling electrical power to the spacedly positioned thermistors. The improvement comprises the provision of a reservoir within the insulative housing for maintaining a predetermined quantity of fuel within the defined fuel passage during operation of the heater.

BEST MODE FOR CARRYING OUT THE INVENTION

Figure 1:
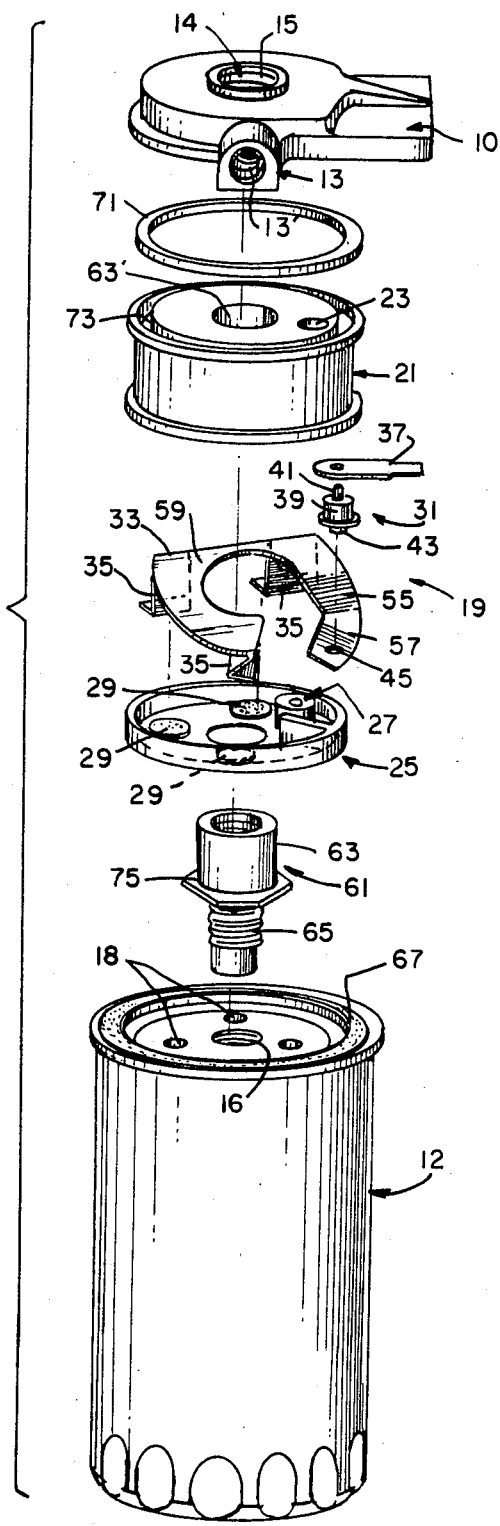
FIG. 1 is an exploded perspective view of a preferred embodiment of the instant invention.

For a better understanding of the present invention, together with other and further objects, advantages and capabilities thereof, reference is made to the following disclosure and appended claims in connection with the above-described drawings.

With particular reference to the drawings, there is shwon a typical diesel fuel filter component including a housing 10 adapted for having a disposable filter element 12 secured thereto, said component readily capable of having the heater of the invention utilized therewith. For this purpose, housing 10 is provided with a fuel inlet pipe 13 which is internally threaded (at 13') and a fuel outlet pipe 14 which is also internally threaded (at 15) such that diesel fuel will enter inlet 13, eventually pass through and be filtered by filter 12, and exit outlet 14. The disposable filter 12 has an internally threaded aperture 16 which, in normal operation, is designed for being screwed onto a protruding, externally threaded male member 17 (FIG. 2) which extends from and forms part of housing 10. Typically, the disposable filter is threaded onto housing 10 until it provides a fluidtight seal against a lower surface thereof. A rubber gasket has been traditionally utilized to assure this seal. In such normal operation, diesel fuel entering inlet 13 is forced through a plurality of orifices 18 spacedly oriented within an upper wall of the filter element. Filtered fuel is thereafter passed up through the central aperture 16 and out outlet 14 of housing 10.

In accordance with the teachings herein, there is defined a diesel fuel heater 19 which is extremely compact in design and which may be readily utilized in existing filter components (such as the above housing 10 and element 12) used today. Diesel fuel heater 19 comprises an electrically insulative housing 21 of substantially cylindrical configuration (preferably possessing a similar outer diameter to that of the also cylindrical disposable filter 12). A preferred material for housing 21 is plastic (e.g., phenolic or nylon). Located within a top wall of housing 21 is a fuel inlet 23 which, in final assembly, is designed for being aligned with inlet 13 such that fuel entering inlet 13 will pass immediatly into and through inlet 23.

Heater 19 also comprises an electrically conductive mounting plate 25 which is preferably also of substantially cylindrical configuration. Plate 25, a sound heat conductor and preferably metallic, is designed for being mounted within a lower part of insulative housing 21 in the manner depicted in FIG. 2. Preferred materials for plate 25 include copper, aluminum, and steel, with the most preferred being copper. Located within mounting plate 25 is a fuel outlet 27 through which the fuel heated by the invention will pass prior to entering the several orifices 18 in filter element 12. Accordingly, mounting plate 25, when securedly positioned within housing 21, combines with the insulative housing to define a fuel passage FP (FIG. 2) through which fuel will pass. Understandably, fuel passage FP extends from inlet 23, through the hollow peripheral portion of housing 21 and thereafter through outlet 27. In FIG. 1, this would be in a substantially clockwise direction. A further description of mounting plate 25, deemed to constitute a particularly significant aspect of this invention, is provided below with the description of FIG. 3.

To heat fuel passing through the housing of the invention, a plurality of positive temperature coefficient (PTC) thermistors 29 are utilized and spacedly positioned within mounting plate 25. Preferably, each of the several PTC thermistors utilized in the invention is of the low temperature switching variety, having a switching temperure within the range of about 0° Celsius to about 15° Celsius. With this type of a PTC thermistor, substantial wattage is expended at low fuel temperatures to effectively dewax the fuel. As fuel temperature increases with increasing ambient, power consumption is reduced in keeping with traditional PTC operation. As stated, several PTC thermistors are utilized in the invention and in one example, a total of seven such elements was utilized. The operation of PTC thermistors is well documented and further description is not believed necessary.

As illustrated in the drawings (especially FIGS. 2 and 3), each of the thermistors of the invention are positioned to readily contact diesel fuel passing within the heater and thus for heating said fuel to the established temperatures. Understandably, the mounting plate having the PTCs located thereon is also heated and thus serves as a second fuel heating means.

Diesel fuel heater 19 further includes means 31 for coupling electrical power (e.g., from the automobile's electrical system) to each of the described spacedly positiojned thermistors 29. Power coupling means 31 comprises a substantially annular, metallic contact spring means 33 which is designed for being positioned within the insulative housing 21 and for extending within mounting plate 25. Spring means 33 is of a sound electrically conductive metallic material (e.g., phosphor bronze or beryllium copper) and includes a plurality of individual spring members 35, each designed for physically engaging a respective one of the spacedly positioned thermistors 19. To provide the desired electrical current to contact spring means 33, a metallic electrical terminal 57 of substantially flat configuration is utilized. As clearly illustrated in FIG. 2, terminal 37 is strategically positioned within a side wall of the insulative housing 21 and projects externally thereof. In operaion, the projecting end of terminal 37 is designed for having a suitable connector (which forms part of the automobile's circuitry) positioned thereon. Terminal 37, being electrically coupled to contact spring means 33 and therefore to each of the several PTC thermistors, thus readily assures a facile means for providing electrical current to the thermistors to achieve energization thereof.

Figure 2:
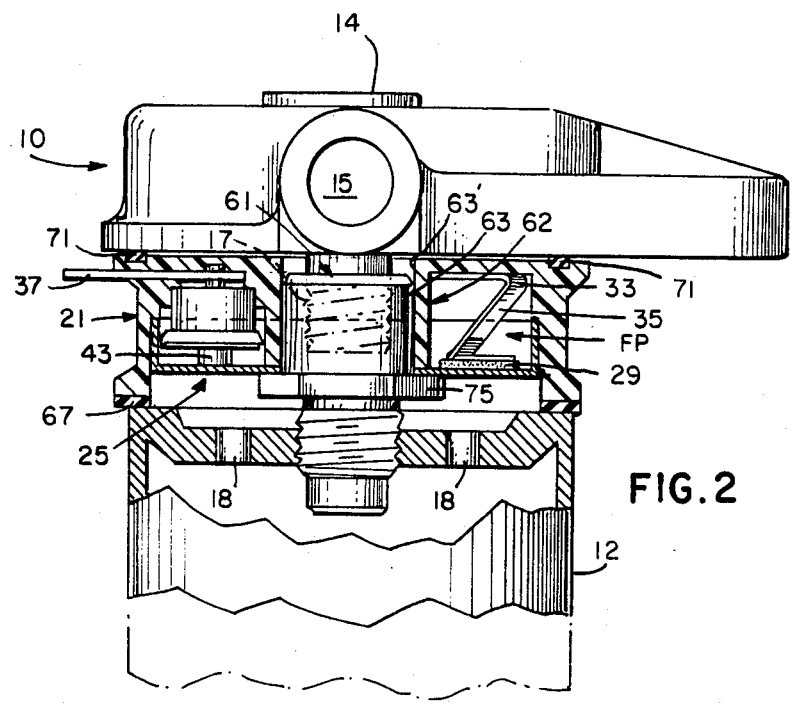
FIG. 2 is an enlarged side elevational view of the invention depicted in FIG. 1 shown in assembled form and partly in section to illustrate the positioning relationships of the various elements thereof.

As also depicted in FIGS. 1 and 2, power coupling means 31 further includes an optional thermostat 39 which includes an upstanding cyclindrical projection 41 designed for having terminal 37 positioned thereon (and thus in electrical contact therewith). The lower part of the thermostat also includes a projecting cylindrical end 43 designed for being inserted within a corresponding opening 45 located within a lower arm segment 57 of contact spring means 33. Theremostat 39 is thus electrically connected at the bottom end thereof to the highly conductive contact spring means 33. The function of thermostat 39 in the present invention, if utilized, is to completely interrupt current flow to the PTC thermistors at a predetermined temperature. Accordingly, when employed, the termostat is designed to go "on" at an established fuel temperature and then switch "off" at a second, higher temperature. Thermostat 39 thus assures that current will flow only when the fuel temperature is within these limits. If higher temperature (those requiring more power) PTCs ae employed, such components assure that the fuel temperature will be retained within the limits defined because PTC current limiting is reduced. In one example, thermostat 39 was designed for having an "on" temperature at about −4° Celsius and an "off" temperature of about 14° Celsius.

With particular regard to FIG. 1, contact spring means 33 may also include a bent (angular) segment 55. When assembled, segment 55 is located adjacent outlet 27 to assist in deflecting diesel fuel passing into housing 21 (from inlet 23) forward through fuel passage FP. As also shown, the contact spring means 33 includes the aforementioned lower arm segment 57 which is designed for being located on the same surface of mounting plate 25 as are positioned thermistors 29. In comparison, the upper, main body portion 59 of contact spring means 33 is located substantially aginst an internal surface of the top wall fo insulative housing 21. This top wall, as shown, also includes the fuel inlet 23, and in the arrangement depicted, it can thus be understood that by being located below bent segment 55 serves to promote passage of diesel fuel inlet 23, entering housing 21 in the desired, closkwise direction. That is, fuel passing through inlet 23 strikes the upper surface of segment 55 and thereafter proceeds in the defined clockwise direction within fuel passage FP.

To enable heater 19 to be readily incorporated within a diesel filter component such as described above, heater 19 further comprises an adapter means 61 which, in final assembly, is positioned substantially within the central, cylindrical-shaped portion 62 of housing 21 (within an orifice 63 therein). Adapter 61 serves to provide an interconnection for housing 10 and filter 12 in such a manner so as to maintain these members in a spaced-apart relationship such that the insulative housing 21 and remaining components of heater 19 may be positioned between both members. As shown, adapter 61 also enables the provision of fluidtight seals between the upper and lower surfaces of the heater's housing and the spaced apart members. Accordingly, heater 19 provides a facile retrofit to many existing diesel fuel filter components. Accordingly, individuals presently utilizing a diesel fuel filter component such as housing 10 and disposable filter 12 need only to remove the disposable filter and insert heater 19 therebetween. Filter 12 is then replaced or, alternatively, a new disposable filter may be added.

To assure this assembly, adaptor 61 includes an internally threaded, upstanding boss member 63 adapted for being threaded onto the externally threaded male member 17 of housing 10. In addition, adapter 61 comprises an externally threaded projecting portion 65 which is adapted for being ded into the internally threaded orifice 16 of filter 12. As stated, orifice 16 was originally designed for having th threaded member 17 of housing 10 positioned therein. Assembly is accomplished by merely threading portion 65 into orifice 16, inserting boss 63 within the central aperture 63' of housing 21, and thereafter threading boss 63 onto male element 17 until a tight fit is attained.

Housing 21, being substantially cylindrical and of a similar outer diameter to filter 12, includes a substantially planar lower surface much like that of housing 10 to thus mate effectively with a gasket 67 typically utilized in filter components. An effective fluidtight seal is thus assured between the bottom part of the heater's insulative housing and filter element 12. To provide an effective seal with the upper part of housing 21 and corresponding housing 10, and annular gasket 71 is provided. To accommodate gasket 71, an annular channel 73 is provided within the upper surface of the heater's insulative housing 21.

To further assist in maintaining mounting plate 25 in position within insulative housing 21, adapter 61 includes a flange portion 75 which positively engages the bottom surface of plate 25 to force it against a corresponding internal ledge within housing 21 when boss 63 is threaded onto the male element 17. This arrangement is best depicted in FIG. 2, and also serves to assist in maintaining housing 21 against the filter's housing 10.

In the diesel fuel heater described in Ser. No. 334,292, one particular problem has occasionally arisen with regard to providing sufficient heating of the diesel fuel passing therethrough. Specifically, air pockets have occasionally occurred in the heater's fuel passage as a result of suction by the fuel system's fuel pump when drawing fuel into the engine. In a diesel fuel system (e.g., automotive) utilizing a filter component such as shown in Ser. No. 334,292, as well as in the instant application, the filter component and heater operate on the suction side of th system's fuel pump. When the pump is in operation, therefore, and such an air pocket is created, no fuel is in contact with heater's mounting plate and PTC thermistors. Heat sinking of the PTCs as would be provided by a body of fuel is thus significantly minimized, in turn reducing the power draw by these components. When the air pocket is eventually removed and fresh fuel is now pumped into the heater's fuel passage, heating thereof is significantly reduced, resulting in a somewhat cooled quantity of fuel passing into the disposable filter element. Understandably, such fuel is incapable of adequately providing de-waxing within the filter to the extent desired.

The present invention substantially eliminates the above problem by providing a reservoir within heater 19 for maintaining a predetermined quantity (in one example, sixteen cubic centimeters was maintained) of diesel fuel therein during periods of operation of heater 19, as well as assuring that said quantity will be retained in the heate subsequent to fuel pump shut-off. When the automotive's fuel system is operational again, this quantity of heated fuel is drawn into the disposable filter to thus enhance filter de-waxing. In addition, by constantly maintaining a predetermind quantity of fuel within the heater, adequate power draw by the PTCs is also maintained to thus assure this body of warm fuel during heater operation.

Figure 3:
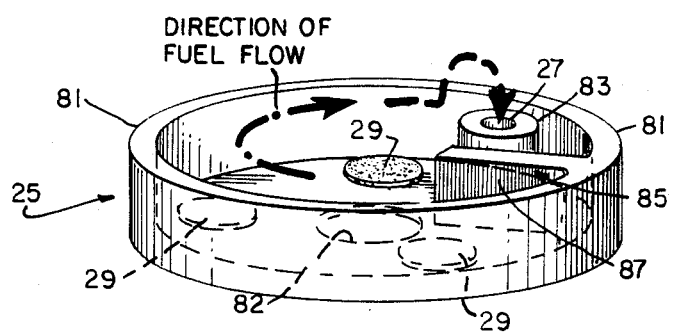
FIG. 3 is an enlarged perspective view of the mounting plate of the invention in accordance with a preferred embodiment thereof.

When comparing FIGS. 2 and 3, it can be readily seen that the described reservoir is assured by providing a substantially cup-shaped mounting plate 24 having external upstanding side walls 81. Thus, when plate 25 is securely oriented in housing 21 as shown in FIG. 2, the centrally located cylindrical part 62 of housing 21 and plate 25 combine to not only define the aforedescribed fuel passage FP but also to capture the needed quantity of fuel. More specifically, the fuel outlet 27 through which fuel passing through the fuel passage is allowed to pass out of heater 19 is located at an established elevation (within an upstanding boss portion 83) within plate 25. Because boss 83 projects substantially above the lanar lower surface of plate 25 on which are located the invention's thermistors, the described quantity of fuel must collect within the heater prior to eventual passage therefrom. In FIG. 3, there is illustrated the direction of fuel flow within plate 25 over thermistor 29 prior to overflowing into outlet 27. Understandably, overflowing occurs when this desired, retained quantity is exceeded. To enhance this overflow, an obstruction 85 in the form of a wall member 87 is provided to extend across and thus block fuel passage FP. In operation, fuel entering inlet 23 will move clockwise (shown in FIG. 3) over each of the thermistors 29 and out outlet 27. Wall 87, which forms part of plate 25 and extends from one of the outer side walls 81 across the fuel passage to mate against the external surface of cylindrical part 62 of housing 21, which extends through a central opening 82 in plate 25, thus completely blockds the fuel passage beyond the location of boss 83 and thereby assists in directing fuel toward outlet 27.

Because plate 25 is a sound heat conductor, the embodiment depicted in FIG. 3 thus also provides for substantially increased total surface area for heating the captured quantity of fuel therein, in comparison to the flat plate design shown in Ser. No. 334,292, for example.

There has thus been shown and described a diesel fuel heater which possesses several advantageous features over heaters presently utilized in the art, including the ability to provide enhanced heating of the fuel passing therethrough. In addition, the heater of the invention is readily adapted for providing a retrofit to existing diesel filter components without the need for modification thereto. Still further, the invention as defined herein is substantially compact in desingn and relatively inexpensive to produce. Lastly, the teachings as provided herein may be incorporated within the heater assemblies shown and described in Ser. No. 334,292 as well as in the application filed herewith under Ser. No. 490,069, filed Apr. 29, 1983 for extensive modification thereto.

While there have been shown and described what are at present the preferred embodiments of the invention, it will be obvious to those skilled in the art that various changes and modifications may be made therein without departing frm the scope of the invention as defined by the appended claims.

What is claimed is:

1. In a diesel fuel heater for use with a fuel filter component having a fuel filter housing and a fuel filter element adapted for being secured to said fuel filter housing wherein said diesel fuel heater includes an electrically insulative housing, a mounting plate positioned substantially within said insulative housing, said mounting plate and said insulative housing defining a fuel passage therein, a plurality of positive temperature coefficient thermistors spacedly positioned on said mounting plate for contacting fuel passing within said fuel passage and for heating said fuel to an established temperature, and means for coupling electrical power to each of said thermistors, the improvement comprising reservoir means within said insulative housing for maintaining a predetermined quantity of fuel within said fuel passage during operation of said diesel fuel heater, the reservoir means being such as to maintain said predetermined quantity of fuel within the reservoir even after fuel pump shut off.

2. The improvment according to claim 1 wherein said mounting plate and said insulative housing define said reservoir means when said mounting plate is positioned substantially within said insulative housing.

3. The improvement according to claim 2 wherein said insulative housing and said mounting plate are each of a substantially cylindrical configuration.

4. The improvement according to claim 2 wherein said mounting plate includes a fuel outlet located at an established elevation within said fuel passage for providing an outlet for fuel within said passage when said fuel exceeds said predetermined quantity.

5. The improvement according to claim 4 wherein said mounting plate includes a substantially planar lower surface and an upstanding boss portion projecting above said lower surface, said fuel outlet located within said boss portion.

6. The improvement according to claim 4 wherein said mounting plate further includes obstruction means located adjacent said fuel outlet for blocking the flow of fuel within said fuel passage beyond the location of said fuel outlet.

7. The improvement according to claim 6 wherein said obstruction means comprises a wall member projecting across said fuel passage.

8. The improvement according to claim 5 wherein said positive temperature coefficient thermistors ar spacedly positioned on said planar lower surface of said mounting plate.

9. The improvement according to claim 1 wherein the material of said mounting plate is selected from the group consisting of copper, aluminum and steel.

10. The improvement according to claim 1 wherein the material of said insulative housing is plastic.

11. A fuel filter assembly for a diesel engine type fuel oil system consisting of a fuel header having a fuel inlet under pressure and a fuel outlet, a spin-on type fuel filter attached to the bottom of the header by a fuel oil conducting means operatively connected to the header outlet and projecting into the top of the filter for the discharge of fuel oil therethrough from the filter, the fuel oil conducting means having an inlet for the discharge of fuel from the filter thereto, the filter having at the top and outer periphery therof fuel inlets, and a fuel resevoir between the header and filter having a fuel inlet connected to the header inlet and a fuel outlet connected to discharge adjacent the top portions of the fuel filter, the resevoir including a disc-like base plate, the resevoir outlet being located vertically upwardly from the base plate of the resevoir to define a fuel channel to maintain a volume of fuel in the resevoir at all times, and an electrical heater means in the resevoir electrically connected to the vehicle electrical system to be energized when the engine is started below predetermined temperature levels to warm the fuel oil in the reservoir above the waxing temperature level of the fuel oil to prevent clogging of the filter upon flow of the fuel oil therethrough during cold engine operation, the area between the inlet of the fuel conducting means and the resevoir defining a vertical space between the filter top portions and the resevoir that is devoid of fuel for direct flow of the heated fuel discharged from the resevoir to the top portions of the filter.

* * * * *